United States Patent
Yao et al.

(10) Patent No.: US 11,751,071 B2
(45) Date of Patent: *Sep. 5, 2023

(54) MANAGEMENT OF GNB IN NETWORK FUNCTIONS VIRTUALIZATION FRAMEWORK

(71) Applicant: Apple Inc., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,002

(22) Filed: Jun. 21, 2022

(65) Prior Publication Data

US 2022/0330035 A1 Oct. 13, 2022

Related U.S. Application Data

(63) Continuation of application No. 16/499,044, filed as application No. PCT/US2018/029319 on Apr. 25, 2018, now Pat. No. 11,405,798.

(Continued)

(51) Int. Cl.
*G06F 9/455* (2018.01)
*H04L 41/0806* (2022.01)
(Continued)

(52) U.S. Cl.
CPC ........ *H04W 16/18* (2013.01); *G06F 9/45537* (2013.01); *G06F 9/45558* (2013.01);
(Continued)

(58) Field of Classification Search
CPC .............................. G06F 9/455–45558; G06F 2009/45562–45595; H04L 41/02–5096;
(Continued)

(56) References Cited

U.S. PATENT DOCUMENTS 10,833,957 B2 * 11/2020 Chou ................... H04W 16/18
10,892,957 B2 * 1/2021 Chou ................... H04W 16/18
(Continued)

FOREIGN PATENT DOCUMENTS

CN  109842892 A * 6/2019 ............ H04W 24/02
WO  2016048430 A1   3/2016
(Continued)

OTHER PUBLICATIONS

ETSI Group Specifition, European Telecommunications Standards Institute (ETSI); "Network Functions Virtualisation (NFV); Managment and Orchestration; Os-Ma-Mfvo reference point—Interface and Information Model Specification"; Sophia Antipolis Cedex, France; Oct. 13, 2016; pp. 1-127, XP014279837.

(Continued)

*Primary Examiner* — Timothy J Weidner
(74) *Attorney, Agent, or Firm* — Kowert, Hood, Munyon, Rankin & Goetzel, P.C.

(57) ABSTRACT

Network Functions Virtualization (NFV) abstracts network functions, allowing them to be installed, controlled, and manipulated by software running on standardized compute nodes such as cloud computing platform rather than on dedicated hardware. In a 5G mobile communications network, the base station or gNB may be split into virtualized and non-virtualized network functions (NFs). Described herein are systems and methods for managing such gNBs within the NFV framework.

20 Claims, 10 Drawing Sheets

Related U.S. Application Data

(60) Provisional application No. 62/490,387, filed on Apr. 26, 2017, provisional application No. 62/489,744, filed on Apr. 25, 2017.

(51) Int. Cl.
| | |
|---|---|
| *H04L 41/0816* | (2022.01) |
| *H04L 41/5003* | (2022.01) |
| *H04L 41/5054* | (2022.01) |
| *H04W 4/50* | (2018.01) |
| *H04W 16/18* | (2009.01) |
| *H04W 24/02* | (2009.01) |
| *H04W 84/02* | (2009.01) |
| *H04W 88/08* | (2009.01) |
| *H04W 88/18* | (2009.01) |
| *H04W 92/02* | (2009.01) |

(52) U.S. Cl.
CPC ...... *H04L 41/0806* (2013.01); *H04L 41/0816* (2013.01); *H04L 41/5003* (2013.01); *H04L 41/5054* (2013.01); *H04W 4/50* (2018.02); *H04W 24/02* (2013.01); *G06F 2009/45562* (2013.01); *G06F 2009/45595* (2013.01); *H04W 84/02* (2013.01); *H04W 88/08* (2013.01); *H04W 88/18* (2013.01); *H04W 92/02* (2013.01)

(58) Field of Classification Search
CPC ......... H04W 4/50; H04W 4/70; H04W 16/18; H04W 16/22; H04W 24/02; H04W 84/02; H04W 84/04–047; H04W 88/08–188; H04W 92/02–24
See application file for complete search history.

(56) References Cited

U.S. PATENT DOCUMENTS

| | | | |
|---|---|---|---|
| 11,405,798 B2 * | 8/2022 | Yao | ........................ H04W 16/18 |
| 2018/0248787 A1 | 8/2018 | Rajagopai et al. | |

FOREIGN PATENT DOCUMENTS

| | | |
|---|---|---|
| WO | 2016054183 A1 | 4/2016 |
| WO | 2018200570 A1 | 11/2018 |

OTHER PUBLICATIONS

3GPP Draft; 28526-100, 3rd Generation Partnership Project (3GPP) "3rd Generation Partnership Project; Technical Specification Group Services and System Aspects; Telecommunication management; Life Cycle Management (LCM) for mobile networks that include virtualized network functions; Procedures (Release 14)"; Sophia-Antipolis Cedex, France; Mar. 4, 2017, XP051235110; 36 Pages.
Extended European Search Report for Patent Application No. EP18791600; dated Oct. 19, 2020; 10 Pages.

* cited by examiner

| ATTRIBUTE | CARDINALITY | CARDINALITY | CONTENT | DESCRIPTION |
|---|---|---|---|---|
| LATENCY | M | 1 | NUMBER | SPECIFIES THE MAXIMUM LATENCY IN MS |
| PACKETDELAYVARIATION | M | 1 | NUMBER | SPECIFIES THE MAXIMUM JITTER IN MS |
| PACKETLOSSRATIO | M | 0...1 | NUMBER | SPECIFIES THE MAXIMUM PACKET LOSS RATIO |
| PRIORITY | M | 0...1 | INTERGER | SPECIFIES THE PRIORITY LEVEL IN CASE OF CONGESTION ON THE UNDERLYING PHYSICAL LINKS |
| BANDWIDTH | M | 0...1 | NUMBER | SPECIFIES THE BANDWIDTH IN MB |

Fig. 9

| PARAMETER | QUALIFIER | CARDINALITY | CONTENT | DESCRIPTION |
|---|---|---|---|---|
| NSINSTANCEID | M | 1 | IDENTIFIER | IDENTIFIER OF THE NS INSTANCE BEING UPDATED |
| UPDATETYPE | M | 1 | ENUM | SPECIFIES THE TYPE OF UPDATE. THIS PARAMETER DETERMINES ALSO WHICH ONE OF THE FOLLOWING PARAMETER IS PRESENT IN THE OPERATION. POSSIBLE VALUES ARE:<br>• ADDVNF (ADDING EXISTING VNF INSTANCE(S)),<br>• REMOVEVNF (REMOVING VNF INSTANCE(S)),<br>• INSTANTIATE V nf (INSTANTIATING NEW VNF(S)),<br>•<br>•<br>–<br>• ADDPNF (ADDING PNF TO THE INSTANCE).<br>• REMOVEPNF (REMOVING PNF FROM THE NS INSTANCE).<br>• REPLACEPNF (REPLACE PNF IN THE NS INSTANCE).<br>•<br>•<br>•<br>• |
| ADDPNFINFO | M | 0... N | ADDPNFINFO | SPECIFIES THE PNFINFO OF THE NON-VIRTUALIZED PART OF GNB BEING ADDED. THIS PARAMETERS SHALL BE PRESENT ONLY IF THE UPDATETYPE = ADDPNF |
| REMOVEPNFDINFOID | M | 0... N | IDENTIFIER | IDENTIFIER OF THE PNFD INFORMATION RELATED TO THE NON-VIRTUALIZED PART OF GNB BEING REMOVED FROM THE NS INSTANCE. THIS PARAMETERS SHALL BE PRESENT ONLY IF THE UPDATETYPE = REMOVEPNF |
| REPLACEPNFDATA | M | 0... M | REPLACEPNFDATA | CONTAINS THE PNFINFO OF THE NEW NON-VIRTUALIZED PART OF GNB, AND THE PNFINFOID OF THE OLD NON-VIRTUALIZED PART OF GNB BEING REPLACED. THIS PARAMETERS SHALL BE PRESENT ONLY IF THE UPDATETYPE = REPLACEPNF |
| NOTE: IF A VNF INSTANCE IS REMOVED FROM AN NS AND THIS NS WAS THE LAST ONE FOR WHICH THIS VNF INSTANCE WAS A PART, THE VNF INSTANCE IS TERMINATED BY THE NFVO. | | | | |

Fig. 11

MANAGEMENT OF GNB IN NETWORK FUNCTIONS VIRTUALIZATION FRAMEWORK

PRIORITY CLAIM

This application is a continuation of U.S. patent application Ser. No. 16/499,044, filed Sep. 27, 2019, which is a U.S. National Stage Entry of PCT/US2018/029319, filed Apr. 25, 2018, which claims priority to U.S. Provisional Patent Application Ser. No. 62/489,744, filed Apr. 25, 2017, and U.S. Provisional Patent Application Ser. No. 62/490,387, filed Apr. 26, 2017, all of which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments described herein relate generally to wireless networks and communications systems. Some embodiments relate to cellular communication networks including 3GPP (Third Generation Partnership Project) networks, 3GPP LTE (Long Term Evolution) networks, 3GPP LTE-A (LTE Advanced), and 3GPP fifth generation networks, although the scope of the embodiments is not limited in this respect.

BACKGROUND

Mobile wireless communications systems have evolved from early voice-only systems to today's highly sophisticated integrated communication platforms in which fourth generation (4G) LTE networks provide data for massive mobile services. New Radio (NR)/fifth generation (5G) technology is being developed to meet the increased future demands brought about by use cases such as enhanced mobile broadband, ultra-reliable and low-latency communications, and machine-to-machine communications for enabling the Internet of Things (IoT). NR technology builds on a combination of existing 4G and new technologies to meet these demands.

An important feature of NR is the network functions virtualization (NFV) framework as defined by the European Telecommunications Standards Institute (ETSI). A concern of the present disclosure is the management of base stations (referred to as next generation evolved Node B or gNB) within the NFV framework.

BRIEF DESCRIPTION OF THE DRAWINGS

FIG. 9 shows an example of a quality of service (QoS) information element according to some embodiments.

FIG. 11 shows a list of the update NS operation input parameters that are included in an NS update request according to some embodiments.

DETAILED DESCRIPTION

Network Functions Virtualization (NFV) abstracts network functions, allowing them to be installed, controlled, and manipulated by software running on standardized compute nodes such as cloud computing platform rather than on dedicated hardware. NFV incorporates cloud and virtualization technologies to allow rapid and flexible development of new network services. In a 5G mobile communications network, the base station or gNB may be split into virtualized and non-virtualized network functions (NFs). Described herein are systems and methods for managing such gNBs within the NFV framework.

Example Radio Architecture

Figure 1:
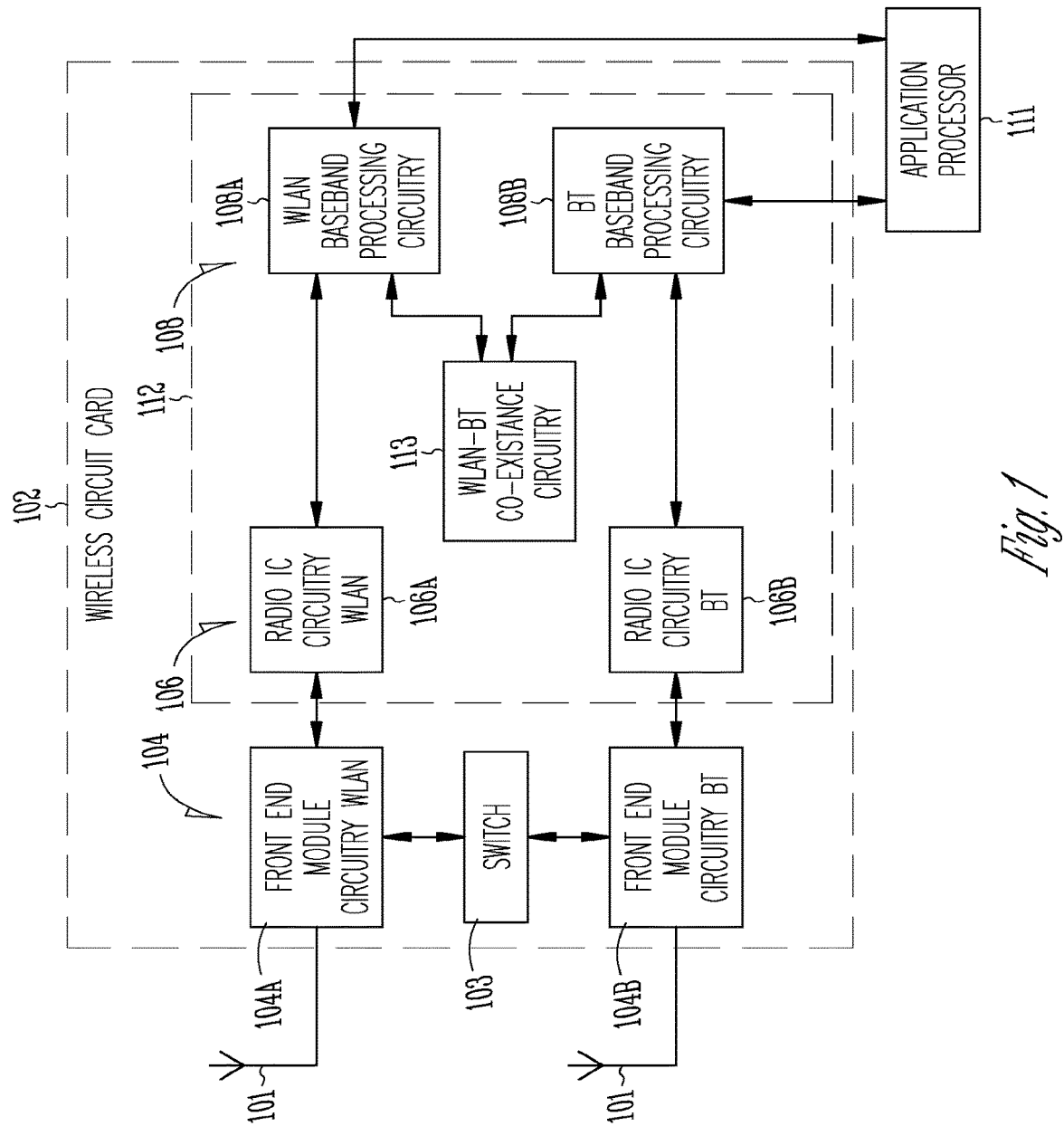
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104B may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 102, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106a may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
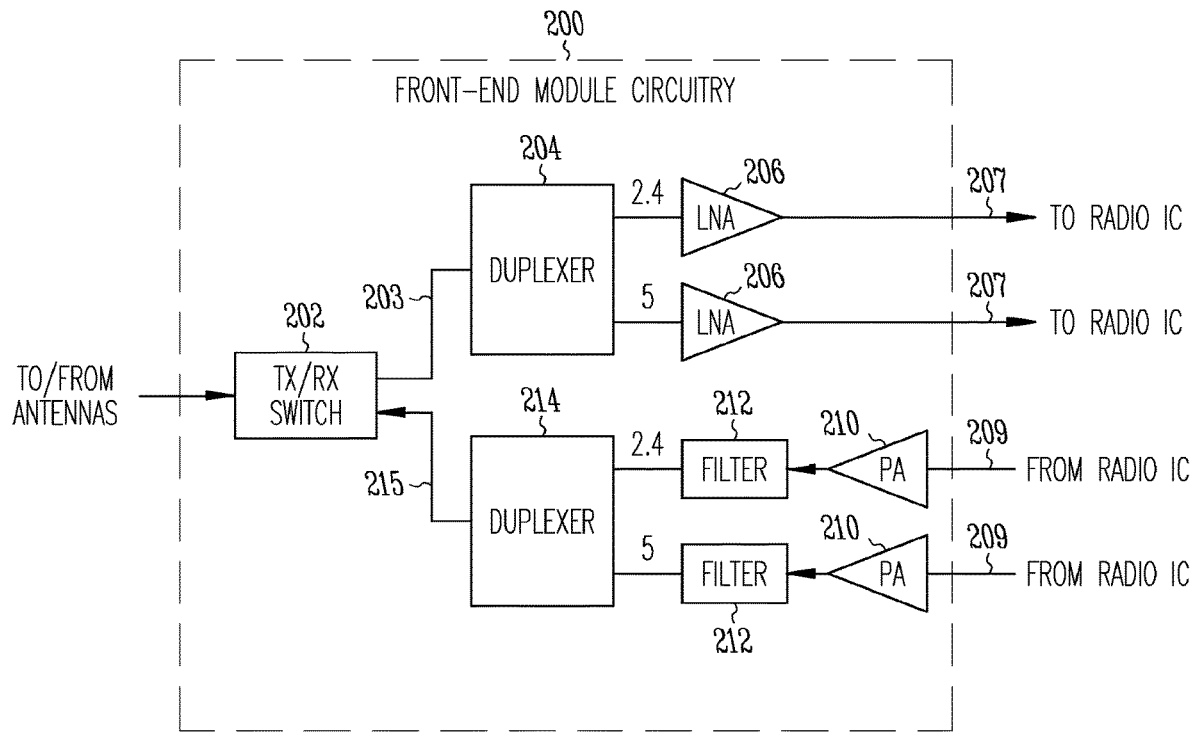
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
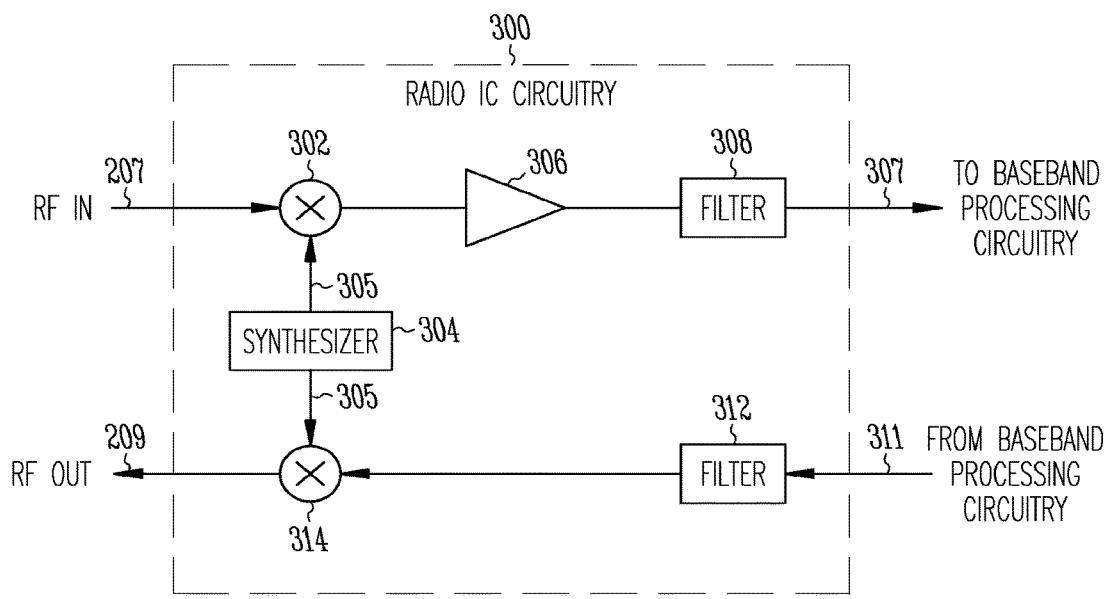
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
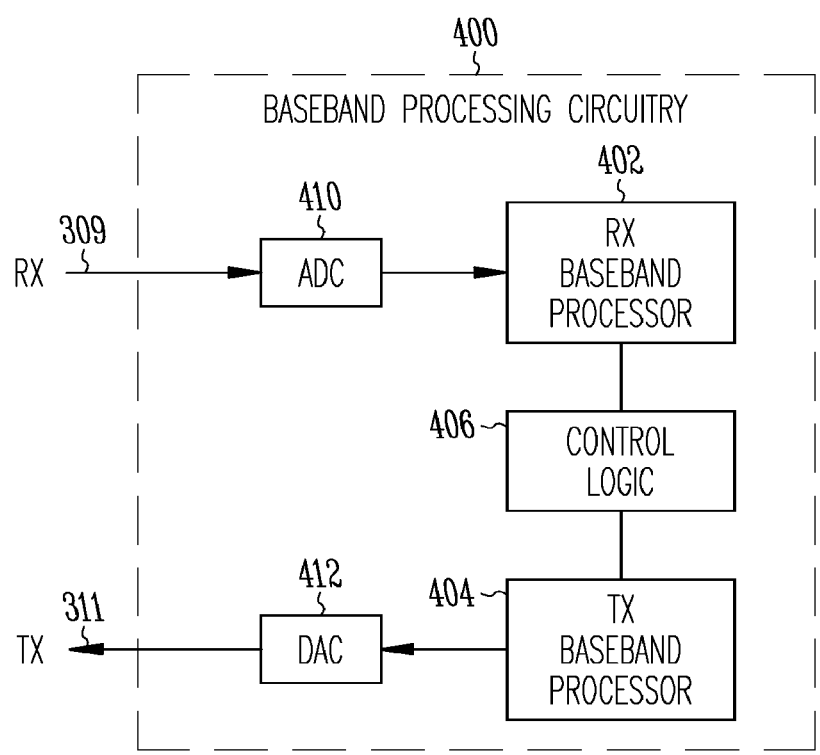
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Example Machine Description

Figure 5:
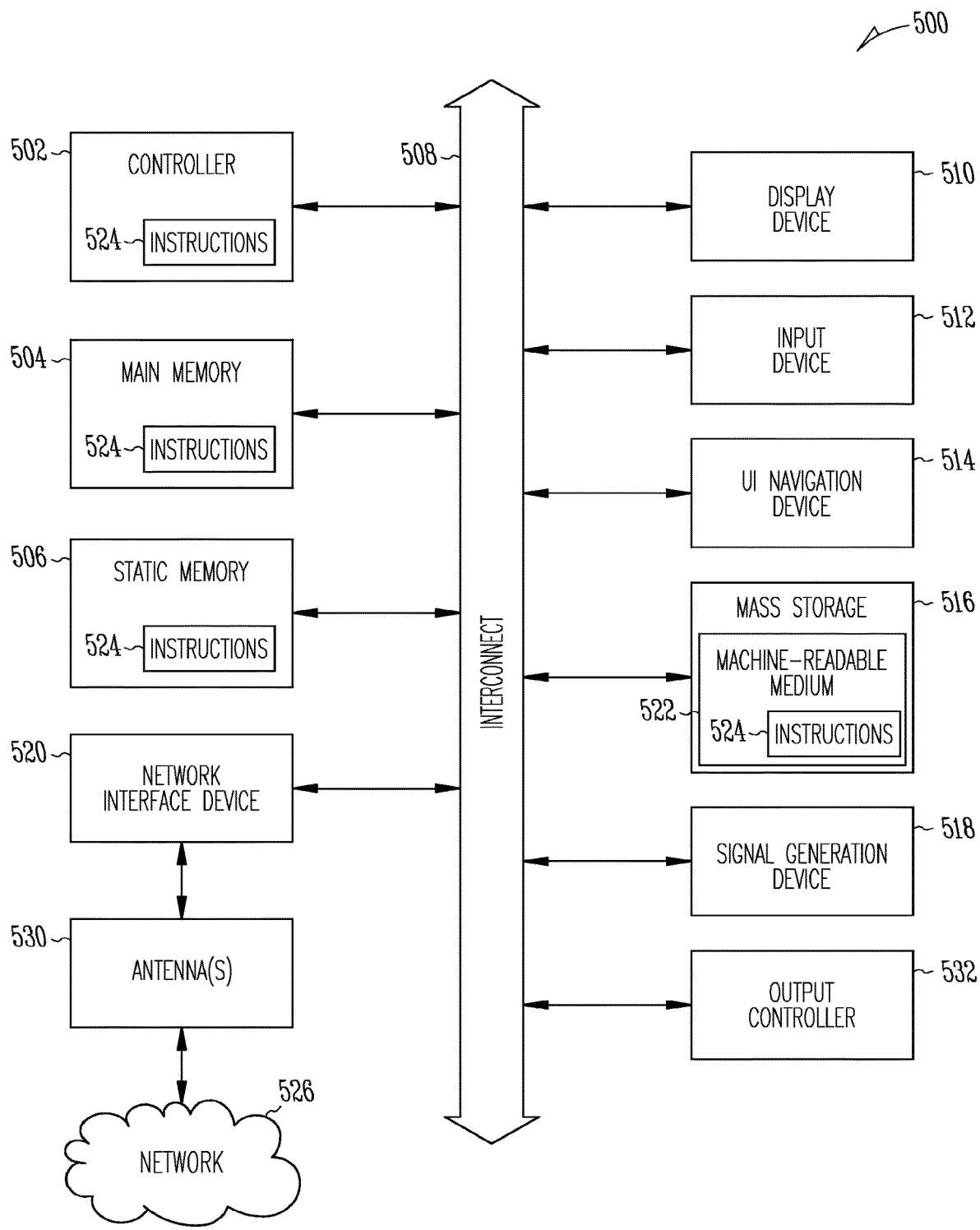
FIG. 5 illustrates an example of a computing machine such as an evolved Node B (eNB) or next generation evolved node B (gNB) according to some embodiments.

FIG. 5 illustrates a block diagram of an example machine 500 upon which any one or more of the techniques (e.g., methodologies) discussed herein may performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), next generation evolved Node B (gNB), next generation access network (AN), next generation user plane function (UPF), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding, or carrying instructions for execution by the machine 500, and includes digital or analog communications signals or other intangible medium to facilitate communication of such software.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
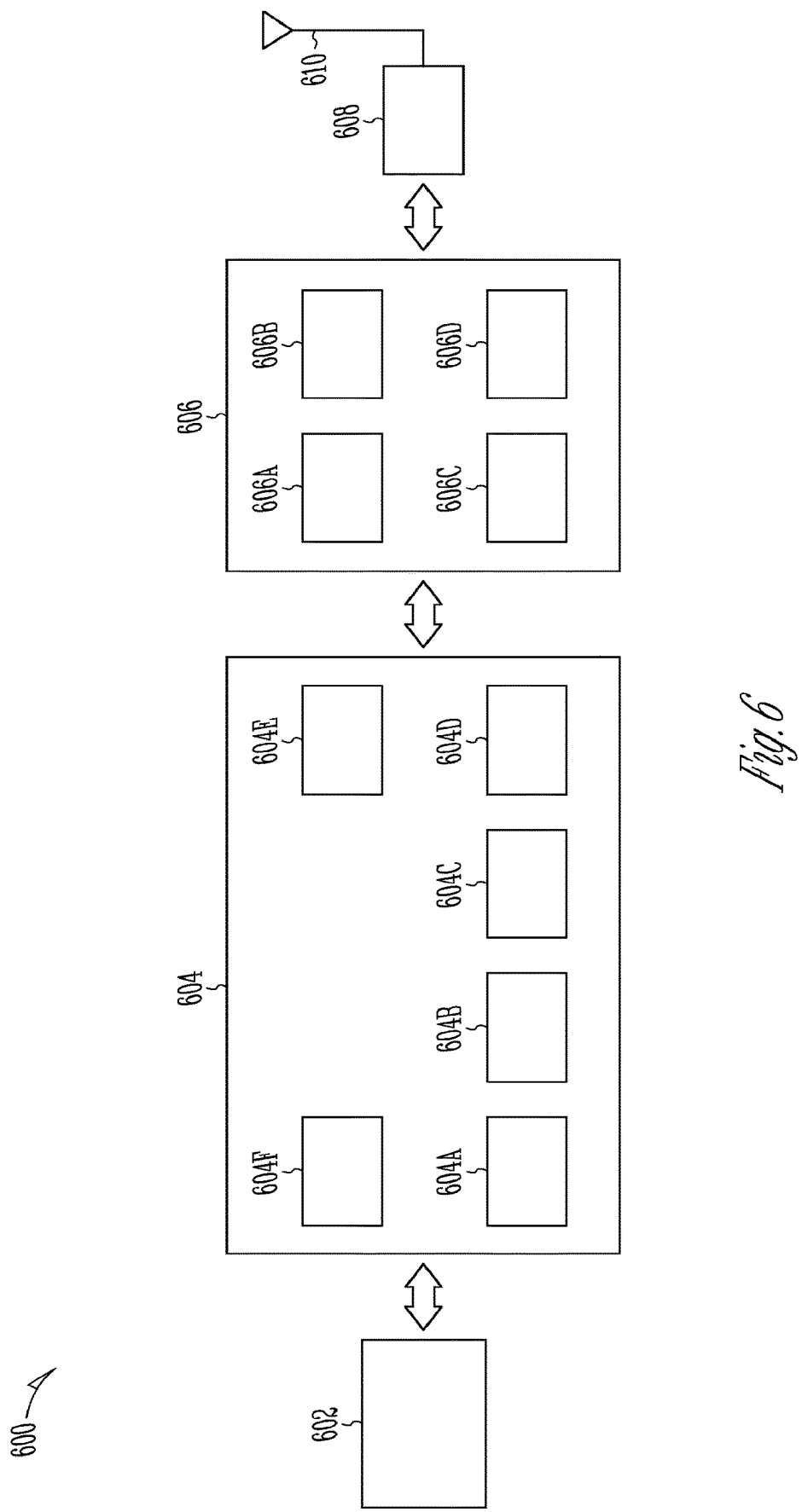
FIG. 6 illustrates an example of a user equipment (UE) device according to some embodiments.

Embodiments described herein may be implemented into a system using any suitably configured hardware and/or software. FIG. 6 illustrates, for one embodiment, example components of a User Equipment (UE) device 600. In some embodiments, the UE device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

In some embodiments, the UE device 600 may include additional elements such as, for example, memory/storage, display, camera, sensor, and/or input/output (I/O) interface.

DESCRIPTION OF EMBODIMENTS

In a 4G core network, referred to as the Evolved Packet Core (EPC), protocols and reference points (i.e., interfaces) are defined for entities such as a Mobility Management Entity (MME), a Serving Gateway (S-GW), and a Packet Data Network Gateway (P-GW). In a 5G/NR network, the network entities are referred to as network functions (NFs), where an NF is a processing function in a network that has defined functional behavior and defined interfaces. Protocols and reference points (i.e., interfaces) are defined for Network Functions (NFs), where an NF can be implemented, for example, as a network element on a dedicated hardware. An important feature of NR is network functions virtualization (NFV) where dedicated network devices are replaced with software running on a cloud computing platform or other general purpose computing platform referred to as an NFV infrastructure (NFVI). In NR systems, a virtualized NF running on an NFVI is referred to a virtual NF (VNF), and a non-virtualized NF running on dedicated hardware is referred to a physical NF (PNF).

Figure 7:
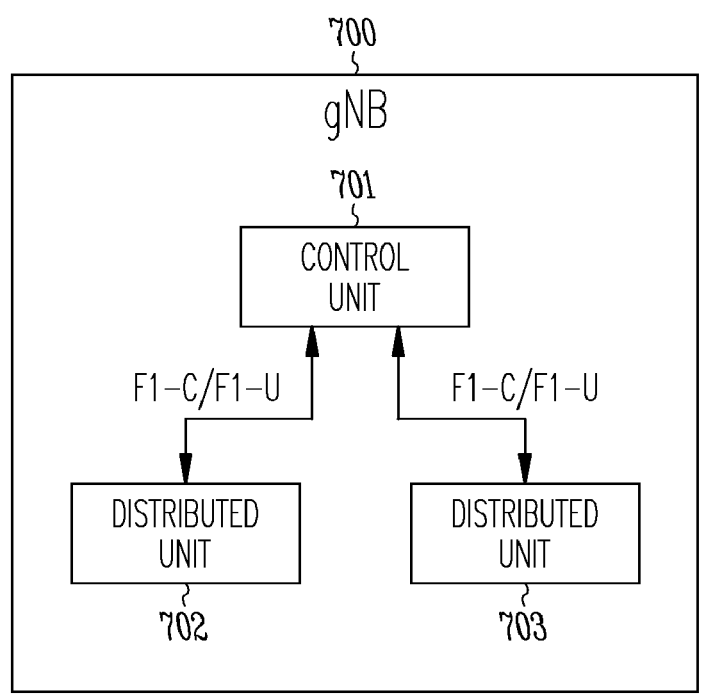
FIG. 7 illustrates the architecture of split gNB according to some embodiments.

In LTE and 5G systems, a mobile terminal (referred to as a User Equipment or UE) connects to the cellular network via a base station (BS), referred to as an evolved Node B or eNB in LTE systems and as a next generation evolved Node B or gNB in 5G or NR systems. The NR based radio access network (RAN) thus extends between the 5G UE and the gNB. The gNB in NR may be divided into two logical nodes, the gNB Central Unit (CU) and one or more gNB Distributed Unit (DUs). The nodes are interconnected with one another over a data plane interface called F1-U and a control plane interface called F1-C. The functions of the gNB are split between the CU and the DU, with the DU providing wireless connectivity with the UE. A CU may be connected to plurality of DUs. FIG. 7 illustrates an example of a gNB 700 that comprises a CU 701 that is virtualized and running in the cloud, and DUs 702 and 703 that are non-virtualized and running in the cell site that provide wireless communication to the UE. That is, the CU is a VNF, and the DUs are PNFs.

Figure 8:
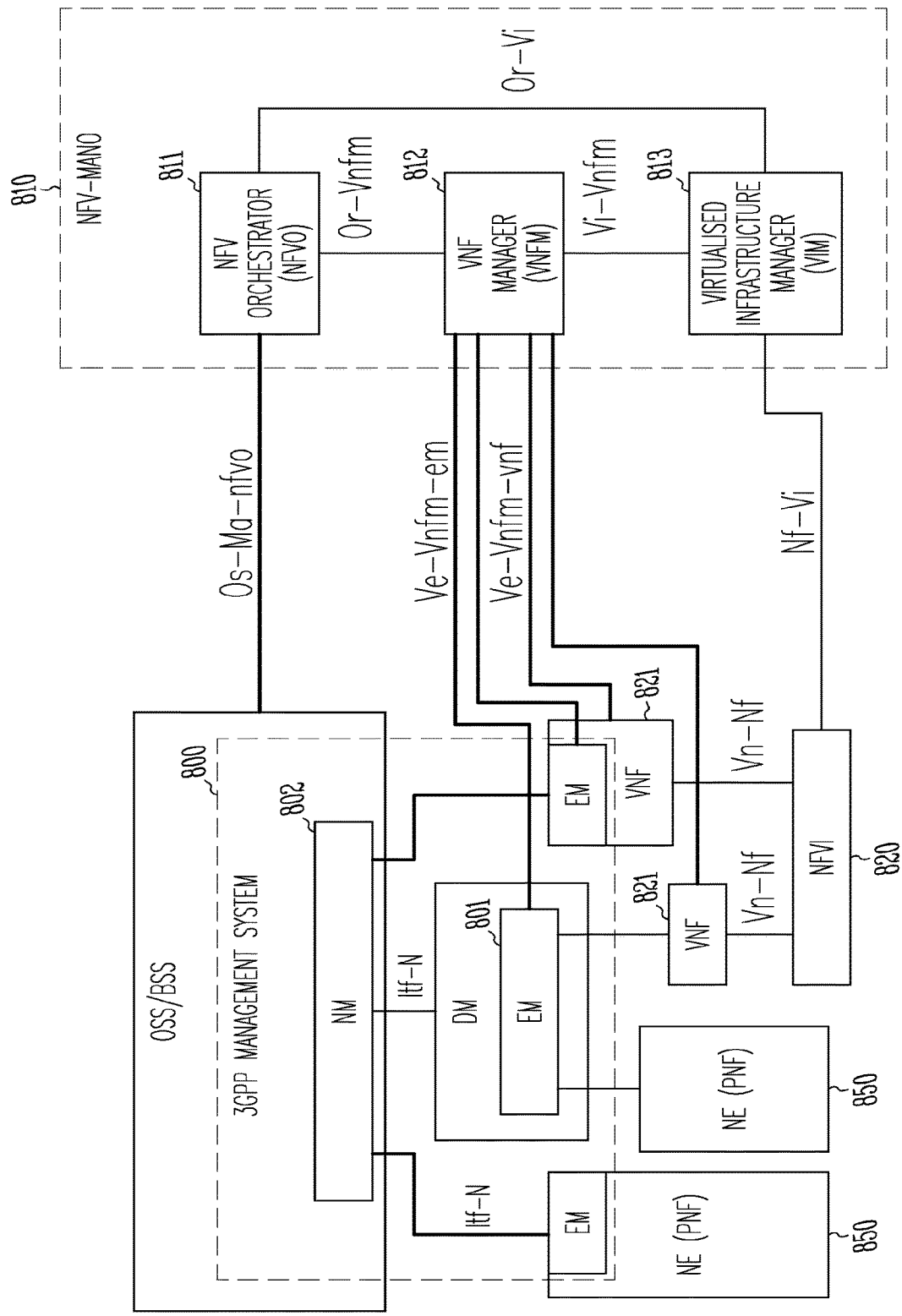
FIG. 8 illustrates the architecture of the NFV framework.

FIG. 8 illustrates the NFV management architectural framework, which is applicable for managing the new RAN as described above, that includes the VNFs 821 running on NVFI 820 and PNFs 850. The NFVI 820 is composed of the hardware and software components that together provide the infrastructure resources where VNFs are deployed. The entities of the framework that will now be described include processing circuitry and memory for running software that implements their functionalities. Application-specific aspects of both VNFs and PNFs are managed by the 3GPP management system 800. The 3GPP management system 800 comprises a network manager (NM) 802 and a domain manager/element manager (DM/EM) 801. The NM 802 is part of the operations support system/business support system (OSS/BSS). The DM/EM 801 may manage both PNFs 850 and VNFs 821. The network functions virtualization management and orchestration (NFV-MANO) 810 is composed of NFV Orchestrator (NFVO) 811, VNF Manager (VNFM) 812, and virtualized infrastructure manager (VIM) 813. The NM 802 initiates and supports the lifecycle management of network service (NS) instances and VNFs through interaction with the NFVO 811. The interfaces or reference points between the framework entities are as shown in the figure with designations Itf-N, Os-Ma-nfvo, Ve-Vnfm-em, and Ve-Vnfm-vnf.

The split architecture gNB with a virtualized CU and one or more non-virtualized DUs may be implemented as follows. A 3GPP NF may contain one or multiple 3GPP network subfunction(s), which may or may not be standardized. For a partially virtualized 3GPP NF (e.g., gNB), some 3GPP Network Subfunction(s) (such as a CU) are running on the NFVI, while some 3GPP network subfunction(s) (such as a DU) are running on the dedicated hardware. In one option, the virtualized part of gNB is implemented as an ETSI ISG NFV defined VNF, and non-virtualized part of gNB is defined as ETSI ISG NFV defined PNF. To support this option, 1) the VNF that runs on a NFV Infrastructure (NFVI) may contain the 3GPP Network Subfunction(s); 2) the PNF may contain the 3GPP network subfunction(s), and its underlying dedicated hardware; 3) 3GPP NF may contain both VNF(s) and PNF(s). In another option, the virtualized part of gNB is implemented as an ETSI ISG NFV defined VNF component (VNFC), and non-virtualized part of gNB is defined as a PNF component (PNFC). To support this option, 1) the VNFC that runs on a NFV Infrastructure (NFVI) may contain the 3GPP Network Subfunction(s); 2) the PNFC may contain the 3GPP Network Subfunction(s), and the underlying dedicated hardware; 3) 3GPP NF may contain both VNFC(s) and PNFC(s).

To support the RAN functional split into a CU and one or more DUs, where a Virtual Link (VL) is used to interconnect two or more entities (i.e., VNF components, VNFs, or PNFs), transport characteristics that include transport latency and transport bandwidth are relevant. The quality of service (QoS) information element as described in the current ETSI specifications that is used to define the characteristics of the transport network, however, does not include the transport bandwidth attribute. In accordance with some embodiments and in order to support transport bandwidth requirements between a CU and a DU, a bandwidth attribute is added to the QoS information element of a virtual link descriptor (VLD). FIG. 9 shows an example of the QoS information element specified in Table 6.5.6.2-1 of ETSI GS NFV-IFA 014 to which a bandwidth attribute has been added that specifies the required bandwidth in MB.

As noted above, the 5G/NR architecture as defined by 3GPP includes a function split feature that splits a gNB into a CU and one or more DUs. A gNB may then comprise a CU that is implemented as a VNF running in the cloud or other infrastructure (i.e., a virtualized part of the gNB) and a DU implemented as a PNF running in the cell site on dedicated hardware (i.e., a non-virtualized part of the gNB) that provides wireless communication to the UE. In ETSI NFV, the Network Service Descriptor (NSD) contains information elements such as a Physical Network Function Descriptor (PNFD), Virtual Network Function Descriptor (VNFD), Virtual Link Descriptors (VLDs), and VNF Forwarding Graph Descriptors (VNFFGDs). The NSD is used as a deployment template for the NFVO to perform the lifecycle management of Network Services (NSs). The NM can use the NSD to instantiate a NS that includes the instantiation of a VNF to represent CU, and the deployment of a PNF to represent DU. In certain situations, an operator may need to deploy a new non-virtualized part of a gNB (DU) to an NS to increase the capacity or coverage of the RAN, remove a non-virtualized part of gNB (DU) from an NS when the non-virtualized part is not needed anymore, or replace a non-virtualized part of gNB (DU) by another one in an NS. That is, it may be necessary to: 1) remove a PNF from the NS due to reasons such as the DU is not needed, 2) add a PNF to the NS due to reasons such as a new DU is needed, and 3) replace the PNF in the NS to a new PNF due to reasons such as the DU is changed. Described herein are mechanisms by which the NS update operation may be used to add, remove, or replace a PNF implementing the DU in the NS.

Figure 10:
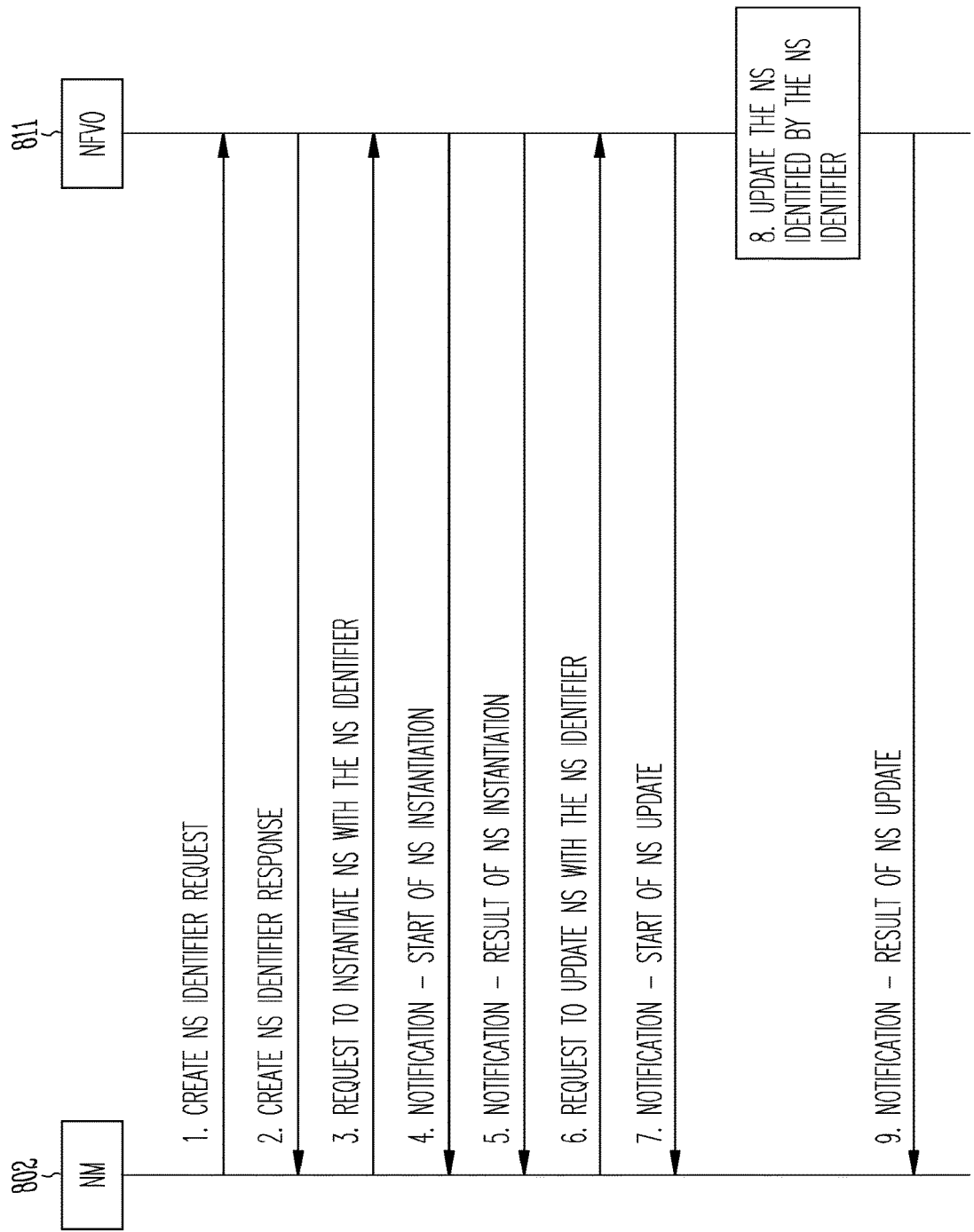
FIG. 10 shows an example of network service (NS) update operations according to some embodiments.

In one embodiment, the NS update operation is used to add, remove, or replace a PNF. FIG. 10 shows an example of the NS update operation. At stages 1-2, the NM uses the NSD that has been on-boarded to request the NFVO to create an NS instance ID. At stages 3-5, the NM requests NFVO to instantiate a NS instance (containing a VNF and a PNF) that is identified by the NS instance ID. At stages 6-9, the NM requests the NFVO to update the NS instance, which is identified by the NS instance ID, to add, remove, or replace the PNF. Not all stages may be necessary in the NS update operation to add, remover, or replace the PNF. For example, if an NS has already been instantiated, then stages 1-5 are not needed.

Before one or DUs can be added to an existing CU to increase the capacity or coverage of the RAN, certain preconditions should be met according to some embodiments. These preconditions include: 1) an NS containing the virtualized part of the gNB has been instantiated, 2) the PNF descriptor (PNFD) of the non-virtualized part of gNB (e.g., DU) to be added is on-boarded to NFVO, and 3) the non-virtualized part of gNB to be added does not yet exist in the NS. The NM then requests the NFVO to add one or more of non-virtualized parts of gNB to an NS. After the NFVO adds the instance(s) of non-virtualized part of gNB to the NS, the NFVO may responds to the NM to indicate the successful result.

Before one or more DUs may be removed from an existing CU because the DUs are not needed as part of the gNB anymore, a necessary precondition is that an NS containing the non-virtualized parts of the gNB has been instantiated. The NM may then request the NFVO to remove one or more of the non-virtualized parts of gNB from an NS. After, the NFVO removes the non-virtualized parts of gNB from the NS, the NFVO may respond to the NM that the non-virtualized parts of gNB have been removed successfully.

In order to replace a DU with a new one for a CU, certain preconditions should be met according to some embodiments. These preconditions include: 1) an NS containing the virtualized part of the gNB has been instantiated, and 2) the PNFD of the new non-virtualized part of gNB for replacing the old one is on-boarded to the NFVO. The NM may then request the NFVO to replace the non-virtualized part of gNB with a new one in the NS. After the NFVO replaces the non-virtualized part of gNB in the NS, the NFVO may respond to the NM that the non-virtualized parts of gNB have been replaced successfully.

Adding, removing and replacing the non-virtualized part of a gNB by updating the NS is based on the assumption that the non-virtualized part of gNB is implemented as a PNF, which is part of the NS. In one embodiment, the NFVO sends an NS lifecycle change notification to the NM indicating the start of the NS update procedure. The NFVO then updates the NS to add, remove, or replace the non-virtualized part of gNB according to the information provide by NM. The NFVO may then send an NS lifecycle change notification to the NM indicating the result of NS update. In one embodiment, the NM requests the NFVO to update the NS instance by an NS update operation, where NS update request contains the following information: 1) an indication of the particular NS instance being updated such as by an nsInstanceId parameter; 2) an indication as whether the request is to add, remove or replace the non-virtualized part of a gNB (or to add, remove or place PNF/PNFC) such as by an updateType parameter; 3) parameter that specifies the PNF/PNFD information of the non-virtualized part of gNB being added such as an addPnfInfo parameter that would normally be present only if the updateType indicates to add the non-virtualized part of a gNB; 4) an indication that the PNF/PNFD information related to the non-virtualized part of gNB being removed from the NS instance such as a remove-PnfdInfoId parameter that would normally be present only if the updateType indicates to remove the non-virtualized part of a gNB; and 5) information relating to the PNF/PNFD information of the new non-virtualized part of gNB and PNF/PNFD information of the old non-virtualized part of gNB being replaced such as a replacePnfData parameter that would normally be present only if the updateType indicates to replace the non-virtualized part of a gNB. FIG. 11 shows a list of the update NS operation input parameters that are included in an NS update request as set forth in Table 7.3.5.2-1 of ETSI GS NFV-IFA 013 to which the parameters discussed above have been added.

Another issue that arises is that an operator may need to know the location where the virtualized part of the gNB is deployed to see whether particular network requirements can be met. These network requirements may include: 1) the transport network requirements between the CU and and the DU, 2) the network requirements for some specific applications, and 3) the network requirements for some specific services (e.g., self-driving car, etc.). After the virtualized part of the gNB has been instantiated, or migrated to a new location (e.g., by VNF scaling, or VNF migration to new NFVI), the NM may get the location of the virtualized part of the gNB from the NFVO by notification or query as follows. The NFVO may notify the NM about the location where the virtualized part of gNB is deployed when the virtualized part of the gNB has been instantiated or migrated to a new location. Alternatively, the NM may request the NFVO to query the location where the virtualized part of gNB is deployed. The NFVO then responds to the NM with the requested location information.

Another issue relates to a CU and DU split of the gNB where specific transport network requirements between the CU and DU need to be met. The location of virtualized part and non-virtualized part of the gNB would affect whether the transport network requirements can be met. The NFVO may need the location of the non-virtualized part of gNB to determine the location where the virtualized part of the gNB is to be deployed. If the location of non-virtualized part of the gNB is known by NM, the NM may provide the location information of the non-virtualized part of gNB to the NFVO via on-boarding or updating the PNFD. The NFVO may then respond to the NM with an indication of the receipt of the location information.

ADDITIONAL NOTES AND EXAMPLES

In Example 1, an apparatus for a network functions virtualization orchestrator (NVFO) in a New Radio (NR) network, the apparatus comprises: memory and processing circuitry; wherein the processing circuitry is to: at the request of a network manager (NM), instantiate a network service (NS) that includes instantiation of a virtualized central unit (CU) for a next generation evolved Node B (gNB) and deployment of one or more non-virtualized distributed units (DUs) for the gNB; and, implement the virtualized CU as a virtual network function (VNF) or virtual network function component (VNFC) and implement the DU as a physical network function (PNF) or physical network function component (PNFC).

In Example 2, the subject matter of Example 1 or any of the Examples herein may optionally include wherein the processing circuitry is to implement the gNB as a network function (NF) that is realized by the VNF or VNFC and the PNF or PNFC.

In Example 3, the subject matter of Example 1 or any of the Examples herein may optionally include wherein the processing circuitry is to use a network service descriptor (NSD) received from the NM as a template to instantiate the NS.

In Example 4, the subject matter of Example 1 or any of the Examples herein may optionally include wherein the NSD includes a virtual link descriptor (VLD) that includes quality of service (QoS) information for an interface between the CU and the DU, wherein the QoS information includes a transport bandwidth requirement.

In Example 4a, the subject matter of Example 1 or any of the Examples herein may optionally include wherein the processing circuitry is to send the NM and indication that the transport bandwidth requirement has been received.

In Example 5, the subject matter of Example 1 or any of the Examples herein may optionally include wherein the processing circuitry is to create an NS identifier for the NS and send the NS identifier to the NM.

In Example 5a, the subject matter of Example 1 or any of the Examples herein may optionally include wherein the processing circuitry is to send to the NM a lifecycle operation occurrence identifier, an NS lifecycle change notification indicating the start of NS instantiation, an NS lifecycle change notification indicating the result of NS instantiation.

In Example 5b, the subject matter of Example 1 or any of the Examples herein may optionally include wherein the processing circuitry is to: upon request by the NM, update the NS as identified by an NS identifier; send an NS lifecycle change notification to the NM indicating the start of NS update; and, send an NS lifecycle change notification to the NM indicating the result of NS update In Example 6, the subject matter of Example 1 or any of the Examples herein may optionally include wherein, to update the NS as requested by the NM, the processing circuitry is to: remove a PNF part of the gNB from the NS instance; add a new PNF part of the gNB to the NS instance; or, replace a PNF part of gNB in the NS instance.

In Example 7, the subject matter of Example 1 or any of the Examples herein may optionally include wherein the processing circuitry is to add a PNF part of the gNB when such is indicated by a parameter in the NS update request.

In Example 8, the subject matter of Example 1 or any of the Examples herein may optionally include wherein the NS update request includes a parameter that specifies information relating to the PNF when the NS update request is to add a PNF.

In Example 9, the subject matter of Example 1 or any of the Examples herein may optionally include wherein the processing circuitry is to remove a PNF part of the gNB when such is indicated by a parameter in the NS update request.

In Example 10, the subject matter of Example 1 or any of the Examples herein may optionally include wherein, when the NS update request is to remove a PNF, the NS update request includes a parameter that specifies an identifier of PNF descriptor (PNFD) information relating to the PNF.

In Example 11, the subject matter of Example 1 or any of the Examples herein may optionally include wherein the processing circuitry is to replace a PNF part of the gNB when such is indicated by a parameter in the NS update request.

In Example 12, the subject matter of Example 1 or any of the Examples herein may optionally include wherein, when the NS update request is to replace a PNF, the NS update request includes a parameter that contains information on the PNF to be added and a parameter for the PNF to be replaced.

In Example 13, the subject matter of Example 1 or any of the Examples herein may optionally include wherein the processing circuitry is to, upon request by the NM, send the NM the location where the VNF part of the gNB is deployed.

In Example 14, the subject matter of Example 1 or any of the Examples herein may optionally include wherein the processing circuitry is to, upon request by the NM, send the NM information relating to the location of the VNF part of the gNB when the VNF is instantiated or migrated to a new location.

In Example 15, the subject matter of Example 1 or any of the Examples herein may optionally include wherein the processing circuitry is to: upon receipt of a PNF descriptor (PNFD) update request from the NM, update the PNFD that contains information relating to the location of PNF part of the gNB; and, upon receipt of a PNFD on-board request from the NM, on-board the PNFD that contains information relating to the location of PNF part of the gNB.

In Example 16, the subject matter of Example 1 or any of the Examples herein may optionally include wherein the processing circuitry is to, after performing an NS instantiation operation, an NS update operation, a PNFD update operation, or a PNF on-board operation, send the results of the operation to the NM.

In Example 17 an apparatus for a network manager (NM) in a New Radio (NR) network, the apparatus comprising: memory and processing circuitry; wherein the processing circuitry is to: request a network functions virtualization orchestrator (NVFO) to instantiate a network service (NS) that includes instantiation of a virtualized central unit (CU) for a next generation evolved Node B (gNB) and deployment of one or more non-virtualized distributed units (DUs) for the gNB; and, wherein the virtualized CU is implemented as a virtual network function (VNF) or virtual network function component (VNFC) and wherein the DU is implemented as a physical network function (PNF) or physical network function component (PNFC).

In Example 18, the subject matter of Example 17 or any of the Examples herein may optionally include wherein the processing circuitry is to request the NFVO via an NS update request to remove a PNF part of the gNB from the NS instance, add a new PNF part of the gNB to the NS instance, or replace a PNF part of gNB in the NS instance as indicated by parameters in the NS update request.

In Example 19, the subject matter of Example 17 or any of the Examples herein may optionally include wherein the NS update request includes a parameter that specifies information on the PNF when the NS update request is to add a PNF In Example 20, the subject matter of Example 17 or any of the Examples herein may optionally include wherein, when the NS update request is to remove a PNF, the NS update request includes a parameter that specifies an identifier of PNF descriptor (PNFD) information relating to the PNF.

In Example 21, the subject matter of Example 17 or any of the Examples herein may optionally include wherein, when the NS update request is to replace a PNF, the NS update request includes a parameter that contains information on the PNF to be added and a parameter for the PNF to be replaced.

In Example 21a, the subject matter of Example 17 or any of the Examples herein may optionally include wherein the processing circuitry is to request the NFVO to send the NM the location where the VNF part of the gNB is deployed.

In Example 21b, the subject matter of Example 17 or any of the Examples herein may optionally include wherein the processing circuitry is to request the NFVO to send the NM information relating to the location of the VNF part of the gNB when the VNF is instantiated or migrated to a new location.

In Example 21c, the subject matter of Example 17 or any of the Examples herein may optionally include wherein the processing circuitry is to: send a PNF descriptor (PNFD) update request to the NFVO that requests the NFVO to update the PNFD that contains information relating to the location of PNF part of the gNB; and, send a PNFD on-board request to the NFVO that requests the NFVO to on-board the PNFD that contains information relating to the location of PNF part of the gNB.

In Example 22, a computer-readable storage medium comprising instructions to cause processing circuitry of a network functions virtualization orchestrator (NVFO), upon execution of the instructions by processing circuitry of the NVFO, to: at the request of a network manager (NM), instantiate a network service (NS) that includes instantiation of a virtualized central unit (CU) for a next generation evolved Node B (gNB) and deployment of one or more non-virtualized distributed units (DUs) for the gNB; and, wherein the virtualized CU is implemented as a virtual network function (VNF) or virtual network function component (VNFC) and wherein the DU is implemented as physical network function (PNF) or physical network function component (PNFC).

In Example 23, the subject matter of Example 22 or any of the Examples herein may optionally include instructions to implement the gNB as a network function (NF) that is realized by the VNF or VNFC and the PNF or PNFC.

In Example 24, the subject matter of Example 22 or any of the Examples herein may optionally include instructions to use a network service descriptor (NSD) received from the NM as a template to instantiate the NS.

In Example 25, the subject matter of Example 22 or any of the Examples herein may optionally include wherein the NSD includes a virtual link descriptor (VLD) that includes quality of service (QoS) information for an interface between the CU and the DU, wherein the QoS information includes a transport bandwidth requirement.

In Example 26, a computer-readable storage medium comprising instructions to cause processing circuitry of a network functions virtualization orchestrator (NVFO) or network manager (NM), upon execution of the instructions by processing circuitry of the NVFO or NM, to perform the functions of the processing circuitry as recited by any of the Examples herein.

In Example 27, a method for operating a network functions virtualization orchestrator (NVFO) or network manager (NM) comprises performing the functions of the processing circuitry as recited by any of the Examples herein.

In Example 28, an apparatus for a network functions virtualization orchestrator (NVFO) or network manager (NM) comprises means for performing any of the methods recited by Example 27.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to 1/10 of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method, comprising:
   by a network functions virtualization orchestrator (NFVO):
   receiving, via a network service (NS) update request from an operations support system/business support system (OSS/BSS), a request including a nsInstanceId parameter and an updateType parameter, to remove a physical network function (PNF) part from an NS instance with updateType set to RemovePnf, or add a new PNF part to the NS instance with updateType set to AddPnf, as indicated by parameters in the NS update request.

2. The method of claim 1, wherein the method further comprises:
   implementing a base station as a network function, NF, that is realized by a virtual network function (VNF) or a virtual network function component (VNFC) and the PNF or a physical network function component (PNFC).

3. The method of claim 1, wherein the method further comprises:
   using a network service descriptor (NSD) received from the OSS/BSS as a template to instantiate the NS.

4. The method of claim 3, wherein the NSD includes a virtual link descriptor (VLD) that includes quality of service (QoS) information for an interface between a virtualized central unit (CU) and a virtualized distributed unit (DU) wherein the QoS information includes a transport bandwidth requirement.

5. The method of claim 1, wherein the method further comprises:
   creating an NS identifier for the NS and sending the NS identifier to the OSS/BSS.

6. The method of claim 1, wherein, to update the NS as requested by the OSS/BSS, the method further comprises:
   removing a PNF part of a base station from the NS instance;
   adding a new PNF part of base station to the NS instance; or
   replacing a PNF part of a base station in the NS instance.

7. The method of claim 6, wherein the method further comprises:
   adding a PNF part of the base station when adding a PNF part of the base station is indicated by a parameter in the NS update request.

8. The method of claim 7, wherein the NS update request includes a parameter that specifies information relating to the PNF when the NS update request is to add a PNF.

9. The method of claim 6, wherein the method further comprises removing a PNF part of the base station when removing a PNF part of the base station is indicated by a parameter in the NS update request.

10. The method of claim 9, wherein, when the NS update request is to remove a PNF, the NS update request includes a parameter that specifies an identifier of PNF descriptor (PNFD) information relating to the PNF.

11. The method of claim 6, wherein the method further comprises:
    replacing a PNF part of the base station when replacing a PNF part of the base station is indicated by a parameter in the NS update request.

12. The method of claim 11, wherein, when the NS update request is to replace a PNF, the NS update request includes a parameter that contains information on the PNF to be added and a parameter for the PNF to be replaced.

13. An apparatus, comprising:
    at least one processor configured to cause a network functions virtualization orchestrator (NFVO) to:
    receive, via a network service (NS) update request from an operations support system/business support system (OSS/BSS), a request including a nsInstanceId parameter and an updateType parameter, to remove a physical network function (PNF) part from an NS instance with updateType set to RemovePnf, or add a new PNF part to the NS instance with updateType set to AddPnf, as indicated by parameters in the NS update request.

14. The apparatus of claim 13, wherein the at least one processor is further configured to cause the NFVO to:
send, upon request by the OSS/BSS, the OSS/BSS a location where a virtualized network function (VNF) part of a base station is deployed.

15. The apparatus of claim 13, wherein the at least one processor is further configured to cause the NFVO to:
send, upon request by the OSS/BSS, the OSS/BSS information relating to a location of a virtualized network function (VNF) part of a base station when the VNF is instantiated or migrated to a new location.

16. The apparatus of claim 13, wherein the at least one processor is further configured to cause the NFVO to:
update, upon receipt of a PNF descriptor (PNFD) updating request from the OSS/BSS, the PNFD that contains information relating to a location of PNF part of a base station; and
on-board, upon receipt of a PNFD on-board request from the OSS/BSS, the PNFD that contains information relating to a location of PNF part of the base station.

17. The apparatus of claim 13, wherein the at least one processor is further configured to cause the NFVO to:
send, after performing an NS instantiation operation, an NS update operation, a PNFD update operation, or a PNF on-board operation, results of the operation to the OSS/BSS.

18. A non-transitory computer readable storage medium storing program instructions executable by at least one processor of a network manager (NM) wherein the program instructions are executable to cause the NM to:
request a network functions virtualization orchestrator (NFVO) via a network service (NS) update request, including a nsInstanceId parameter and an updateType parameter, to remove a physical network function (PNF) part from an NS instance with updateType set to RemovePnf, or add a new PNF part to the NS instance with updateType set to AddPnf, as indicated by parameters in the NS update request.

19. The non-transitory computer-readable storage medium of claim 18, wherein the NS update request includes a parameter that specifies information on the PNF when the NS update request is to add a PNF.

20. The non-transitory computer-readable storage medium of claim 18, wherein the at least one processor is further configured to cause the NM to use a network service descriptor (NSD) which includes a virtual link descriptor (VLD) that includes quality of service (QoS) information for an interface between a virtualized central unit (CU) and a non-virtualized distributed unit (DU) wherein the QoS information includes a transport bandwidth requirement.

* * * * *